United States Patent
Benasutti

[11] Patent Number: 6,093,227
[45] Date of Patent: Jul. 25, 2000

[54] AIR FILTER WITH LABYRINTH AIR FLOW PATTERN THROUGH AN AIR FILTER INSERT

[75] Inventor: Louis D. Benasutti, Fairborn, Ohio

[73] Assignee: ITT Manufacturing Enterprises, Inc., Wilmington, Del.

[21] Appl. No.: 09/140,568

[22] Filed: Aug. 27, 1998

[51] Int. Cl.[7] .......................... B01D 27/00; B01D 45/06; B01D 50/00
[52] U.S. Cl. ................................ 55/332; 55/391; 55/436; 55/503; 55/DIG. 17; 96/189
[58] Field of Search .............................. 55/320, 332, 391, 55/392, 394, 395, 396, 503, DIG. 17, 318, 434, 436; 96/188, 189, 190

[56] References Cited

U.S. PATENT DOCUMENTS

| | | |
|---|---|---|
| 2,083,649 | 6/1937 | Heglar ........................................ 55/391 |
| 4,749,385 | 6/1988 | Brunner et al. ............................ 55/332 |
| 5,036,844 | 8/1991 | Pouchot et al. ............................ 55/318 |
| 5,846,271 | 12/1998 | Flynn et al. ............................... 55/315 |

FOREIGN PATENT DOCUMENTS

| | | | |
|---|---|---|---|
| 1172798 | 6/1964 | Germany ................................. 55/320 |

*Primary Examiner*—David A. Simmons
*Assistant Examiner*—Robert A. Hopkins
*Attorney, Agent, or Firm*—J. Gordon Lewis

[57] ABSTRACT

An air filter apparatus includes a filter body mountable in a support surface. A filter insert is mounted in a bore extending from one end of the body. A labyrinth air flow path is formed between a portion of the exterior surface of the filter body and an end cap mounted over an end portion of the body and through the filter insert in the bore in the body to prevent the ingestion of fluid through the filter.

13 Claims, 5 Drawing Sheets

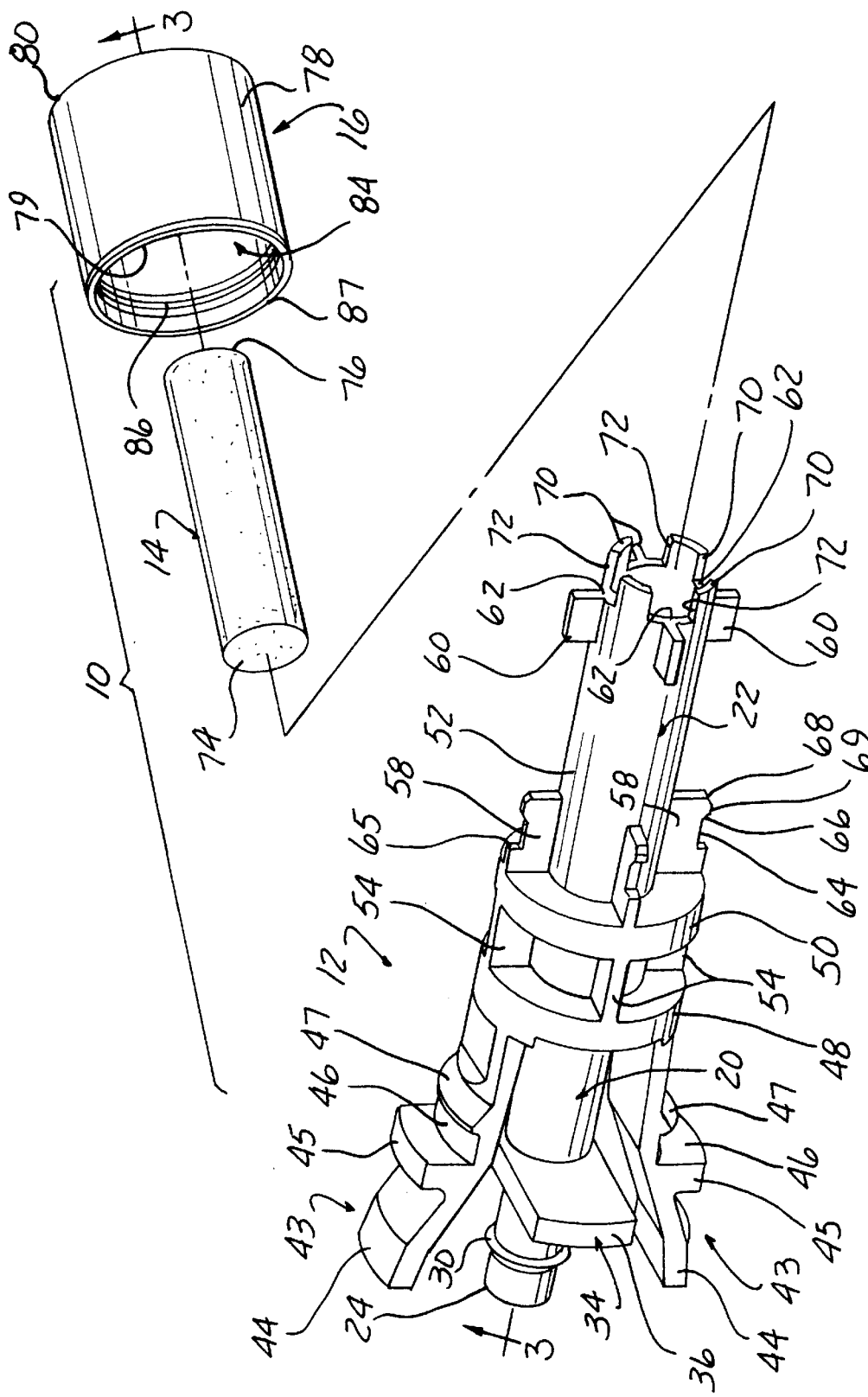

AIR FILTER WITH LABYRINTH AIR FLOW PATTERN THROUGH AN AIR FILTER INSERT

BACKGROUND OF THE INVENTION

1. Field of the Invention

The present invention relates, generally, to air filters and, specifically, to air intake filters for air compressors.

2. Description of the Art

It is known to provide vehicles, such as automobiles or trucks, with an on-board air compressor for supplying pressurized air for use in air shock absorbers or to a pressurized air outlet for diverse applications, such as supplying air to the vehicle tires and other external objects. Typically, the air compressor is mounted on the vehicle underbody in an area susceptible to moisture, water splashes, etc. Thus, the air intake on the compressor must be protected against water and moisture ingestion. Typically, this is accomplished by routing the air intake lines to a friendly air supply and generally using a filter at the intake end of the air compressor. In some applications, these precautions have not provided adequate protection against water entry into the compressor.

FIG. 1A depicts a prior art air compressor intake filter in which a filter body is mounted by means of integral latch members to a vehicle support structure, such as a side wall of the vehicle frame rail. An elongated tubular portion extends from the latch members on the filter body and connects to an air intake hose or conduit by means of integral barbs. The air intake hose or conduit extends to the air compressor.

A bore extends through the elongated tubular portion and opens to an enlarged bore in the filter body which receives a filter insert, such as a sponge urethane or foam filter. In this filter, the outer end of the filter insert extends outward beyond the end of the filter body and is exposed to the ambient environment. This exposes the end of the filter to water and moisture which can wick or pass through the filter and into the bore in the filter body thereby causing water or moisture ingestion through the air intake hose to the air compressor.

FIG. 1B depicts another prior art air compressor intake filter which is similar to the intake filter shown in FIG. 1A and described above. The intake filter shown in FIG. 1B differs from that of FIG. 1A only in the attachment mechanism and orientation site.

Thus, it would be desirable to provide an air filter which prevents water ingestion into a connected component, such as a vehicle air compressor. It would also be desirable to provide a filter for a vehicle air compressor which can be easily mounted to vehicle support structure in a small compact space.

SUMMARY OF THE INVENTION

The present invention is an air filter apparatus having a labyrinth air flow which can be advantageously employed in a vehicle air compressor.

Preferably, the air filter apparatus of the present invention comprises:

a body having a through bore;

an air filter element mountable within the bore; and means, cooperating with the body, for forming a labyrinth air flow path from an air inlet through the bore in the body.

Preferably, the air flow path forming means includes means for forming an air flow path having multiple flow directions. In one example, the air flow directions are opposed. More preferably, the air flow directions are substantially parallel to each other.

In one embodiment, the air flow path forming means includes the filter body having a tubular end portion. A plurality of ribs extend outward from the end portion, each rib having an outer edge. A cap has a side wall with an inner surface, a closed end, and an opposed open end. The cap is removably mounted over the ribs on the body with the ribs spacing the inner surface of the sidewall and the closed end of the cap from the filter body to form an air flow path between the inner surface of the cap and the exterior surface of the tubular end portion of the filter body. The cap is mounted in a fixed position on the exterior surface of the body to space the open end of the cap from an adjacent flange on the body to form an air inlet.

At least one and, preferably, a plurality of circumferentially spaced apertures are formed in the end of the tubular end portion of the filter body to dispose the air flow path formed between the exterior surface of the tubular end portion of the filter body and the inner surface of the sidewall and the closed end of the cap in full communication with the filter insert mounted in the bore in the filter body.

More particularly, the ribs comprise a plurality of pairs of axially spaced ribs. One rib of each axially spaced pair of ribs has a notch which forms an end projection. The end projection is engagable with a recessed groove formed on the inner surface of the sidewall of the cap to lock the cap in position on the body and to space the open end of the cap from an adjacent flange on the body.

Edges of each of the ribs as well as an inner edge of the projection formed by each notch in one of the ribs of each rib pair may be angled or chamfered to aid in guiding the cap over the ribs.

The air filter apparatus is a present invention uniquely forms a labyrinth air flow path which substantially minimizes the ingestion of water or other fluids through the air filter and then to a connected component such as a vehicle air compressor in a particular exemplary application. The air filter apparatus of the present invention is of simple construction and may be easily mounted in various locations.

BRIEF DESCRIPTION OF THE DRAWINGS

The various features, advantages and other uses of the present invention will become more apparent by referring to the following detailed description and drawing in which:

FIG. 2 is an exploded, perspective view of the air filter of the present invention;

DESCRIPTION OF THE PREFERRED EMBODIMENT

Figure 1A:
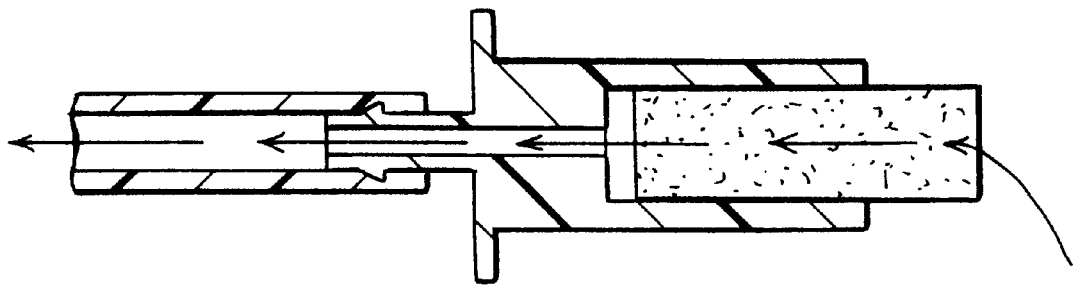
FIGS. 1A and 1B are side elevational, cross sectional views of two prior art air intake filters for a vehicle air compressor.
Figure 1B:
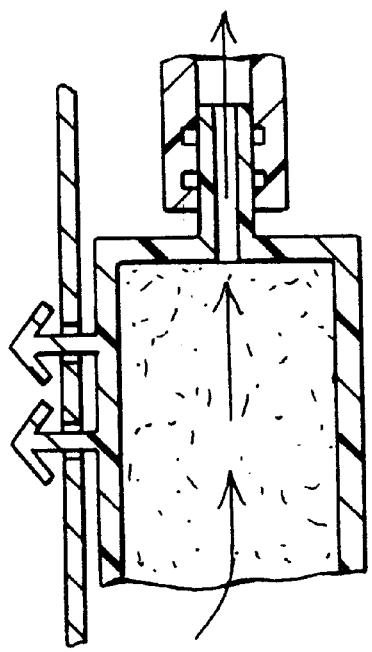

Referring now to the drawing and to FIGS. 2–6, in particular, there as depicted an air filter 10 particularly designed for use with a vehicle air compressor. The air filter 10 includes a filter body 12, a filter insert 14 and an end cap 16.

The filter body 12 is preferably of one piece, unitary construction formed of a suitable plastic material. For example, an Olefin may be employed and molded into the illustrated shape described hereafter.

Figure 5:
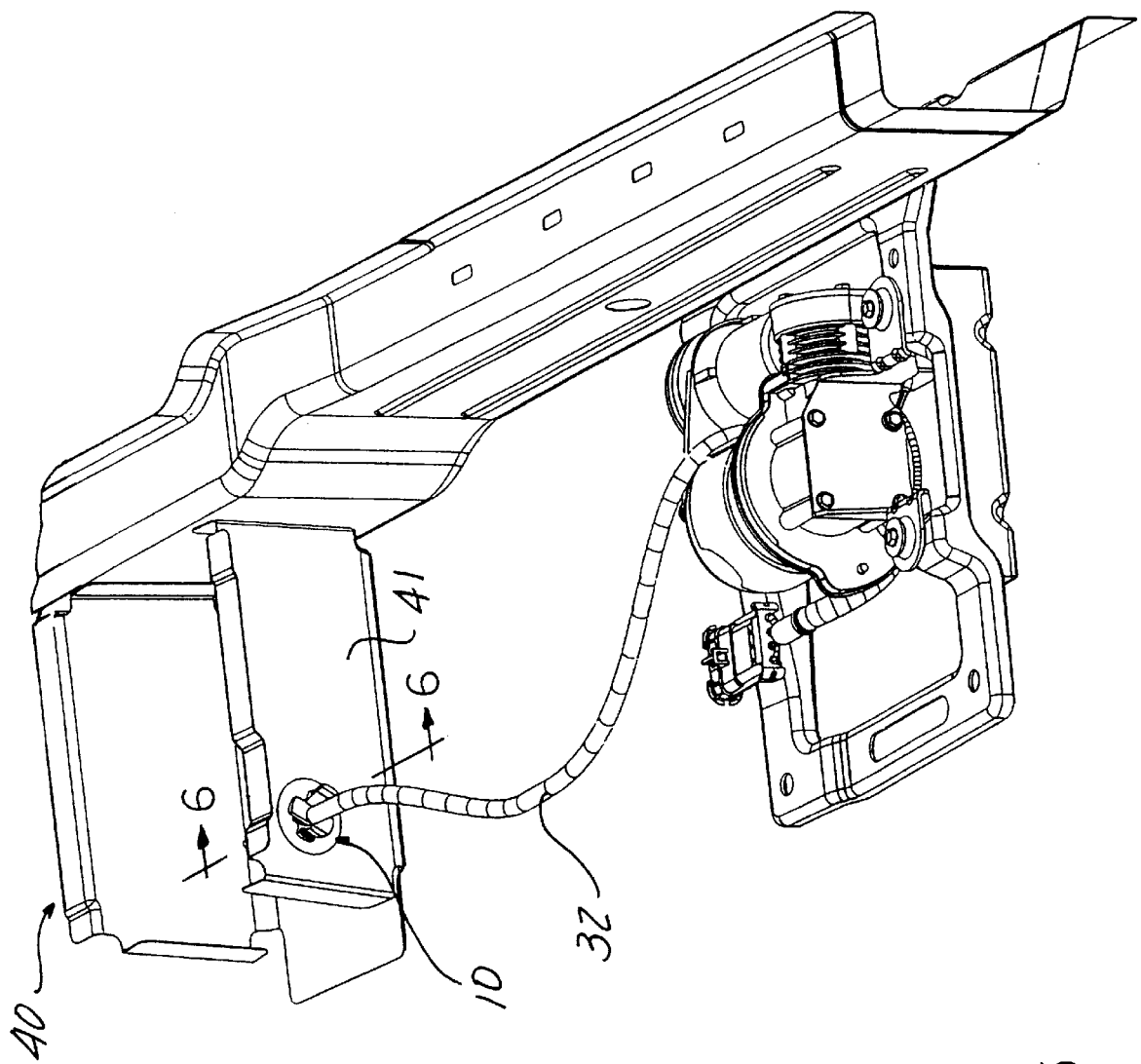
FIG. 5 is a perspective view of the present air filter mounted in a vehicle frame member.

The filter body 12 includes axially aligned first and second tubular portions 20 and 22. The first tubular portion 20 preferably has a circular cross section with an internal bore 26 extending therethrough from a first outer end 26 to a bore 28 in the second tubular portion 22. By example only, the inner diameter of the bore 28 is larger than the inner diameter of the bore 26. At least one annular barb 30 was formed externally on the first tubular portion 20 adjacent the end 26 for receiving and rigidly connecting a flexible hose or conduit 32 to the first tubular portion 20. The hose 32 extends to the air intake of a vehicle air compressor as shown in FIG. 5. A stop member 34 is integrally formed generally intermediate on the first tubular portion 20 and has opposed ends 36 and 38 projecting outward from the first tubular portion 20. The stop member 34 is designed to abut a stationary support, such as a side wall of a vehicle body cross member 40 as shown in FIGS. 5 and 6 to limit the insertion distance of the filter body 12 through an aperture 42 in the body cross member 40.

The second tubular portion 22 of the filter body 12 has a pair of first and second axially spaced, annular flanges 48 and 50 extending outward from the outer surface 52 of the second tubular portion 22. The annular flanges 48 and 50 are spaced apart and interconnected by axially extending spacers 54.

Figure 6:
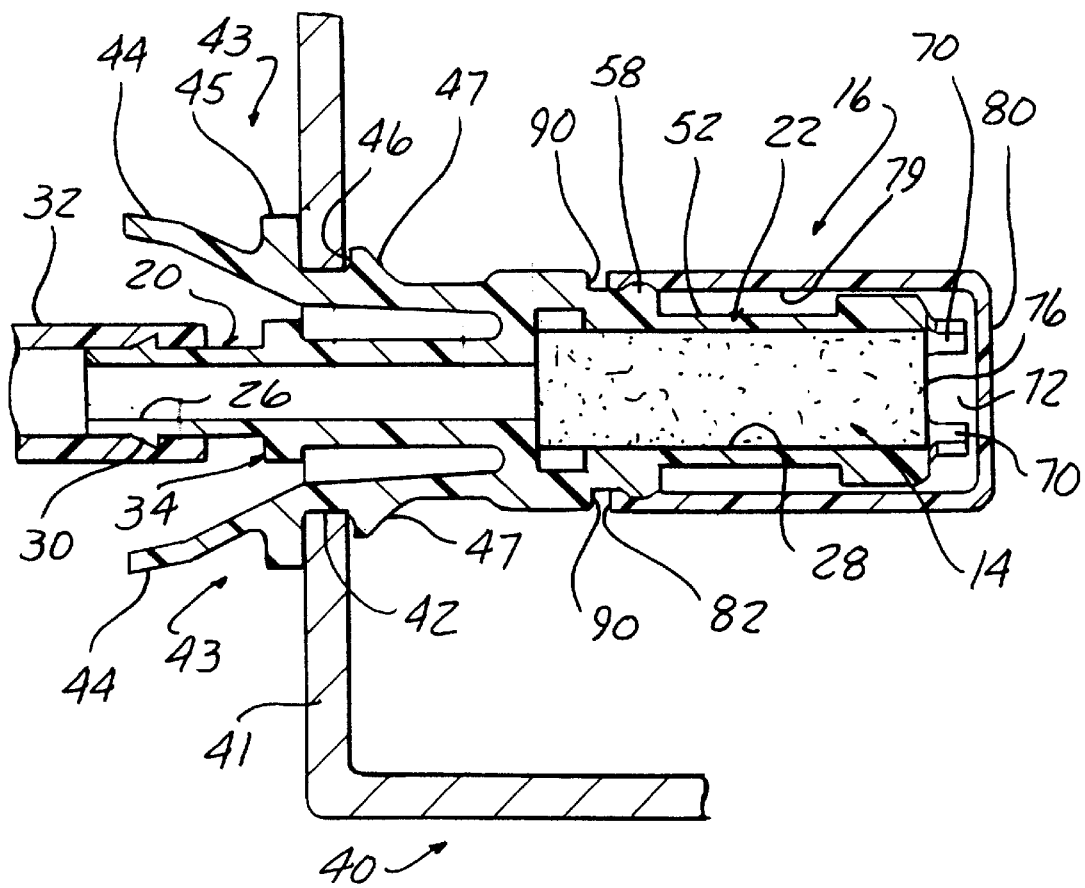
FIG. 6 is a longitudinal, cross sectional view taken along line 5–6 in FIG. 5 showing the mounting of the air filter of the present invention in a vehicle frame member.

As shown in FIGS. 2 and 6, a pair of wings 43 are cantilevered from the first annular flange 48. The wings 43 are generally diametrically opposed and disposed between the opposed ends 36 and 38 of the stop 34. Each wing 43 has an outer end pad 44 which may be used to apply force to bend the wings 43 radially inward for separation of the filter body 12 from its mounting surface. A first flange 45 is also formed externally on each wing 43 generally adjacent to a latch notch 46. A raised cam surface 47 is formed on the other side of the first flange 45.

When the wings 43 are squeezed together and the filter body 12 urged through the aperture 42 in the vehicle body cross member 40, as seen in FIGS. 5 and 6, cam surface 47 on each wing 43 will strike the vehicle body cross member 40 and initially cause each wing 43 to bend radially inward until the edge structure of the side wall 41 bounding the aperture 42 in the vehicle body cross member 40 passes over the raised edge of each cam surface 47 and into the latch notch 46. As shown in FIG. 6, in this position, the side wall 41 of the vehicle body cross member 40 is latched in the latch notch 46 between the first flange 45 and the cam surface 47 which rigidly positions the filter body 12 on the side wall 41 of the vehicle body cross member 40.

When it is necessary to remove the filter body 12 from the body cross member 40, radially inward force exerted on each of the outer end pads 44 on both wings 43 will cause the cam surface 47 to move radially inward a sufficient distance to clear the inner edge of the aperture 42 in the side wall 41 of the body cross member 40 enabling the entire filter body 12 to be slid outward through the aperture 42 in the side wall 41 of the body cross member 40.

According to the present invention, a labyrinth or multi-directional flow path means are provided on the air intake filter 10 to minimize the possibility of water or fluid ingestion through the air filter 10 to the air intake hose 32 connected to the air compressor. The labyrinth air flow path means include a plurality of mounting ribs or flanges formed on the external surface 52 of the second tubular portion 22 which extend radially outward from the exterior surface 52. Although a minimum of two elongated ribs could be employed, by way of example, a plurality of pairs of axially aligned ribs are provided, with each pair formed of a first rib 58 and a spaced second rib 60. Further, also by way of example, four pairs of axially aligned ribs 58, 60, are provided on the second tubular portion 22. The first rib 58 of each rib pair is disposed adjacent to the second angular flange 50. The second rib 60 of each rib pair is spaced from the associated first rib 58 and is located generally adjacent to the second end 62 of the second tubular portion 22.

Each first rib 58 has a generally rectangular shape with a notch or cutout 64 formed on an outer edge. The notch 64 has an angled or chamfered edge 66 adjacent one side thereof. The outer upper edge 68 of each first rib 58 is also chamfered or angled for purposes which will become more apparent hereafter. Likewise, the outermost upper end of each second rib 60 may also be angled or chamfered to guide the insertion of the end cap 16 over the pairs of ribs 58 and 60.

As also shown in FIG. 2, a plurality of axially extending fingers 70 project from the second end 62 of the second tubular portion 22. The fingers 70 are circumferentially spaced apart by apertures, such as notches 72 formed in the second tubular portion 22. The notches 72 are open to fluid communication with the bore 28 in the second tubular portion 22. Preferably four fingers 70 are provided on the second tubular portion 22, each one disposed between two adjacent second ribs 60.

Figure 3:
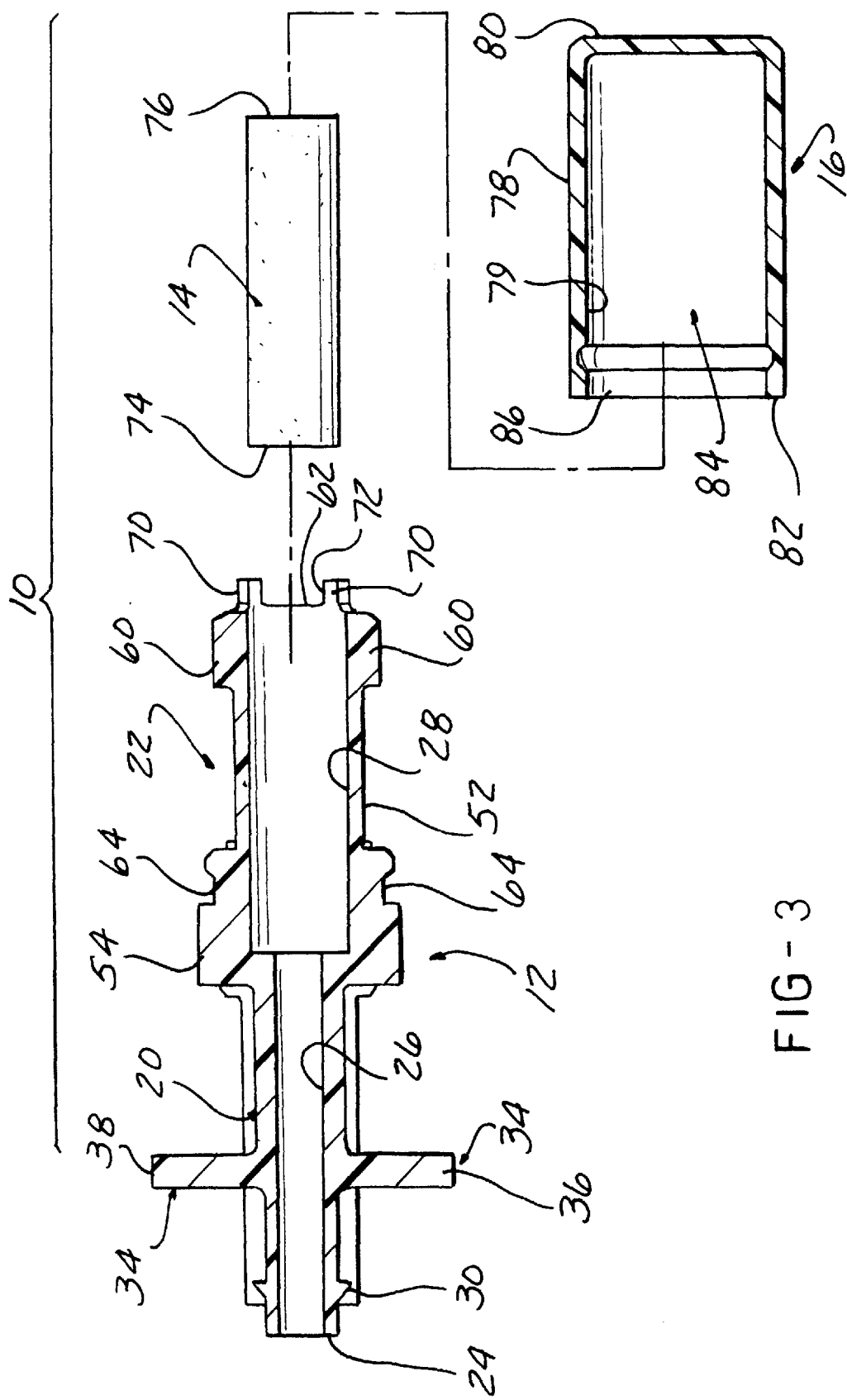
FIG. 3 is an exploded, longitudinal, cross sectional view generally taken along line 3—3 in FIG. 2.
Figure 4:
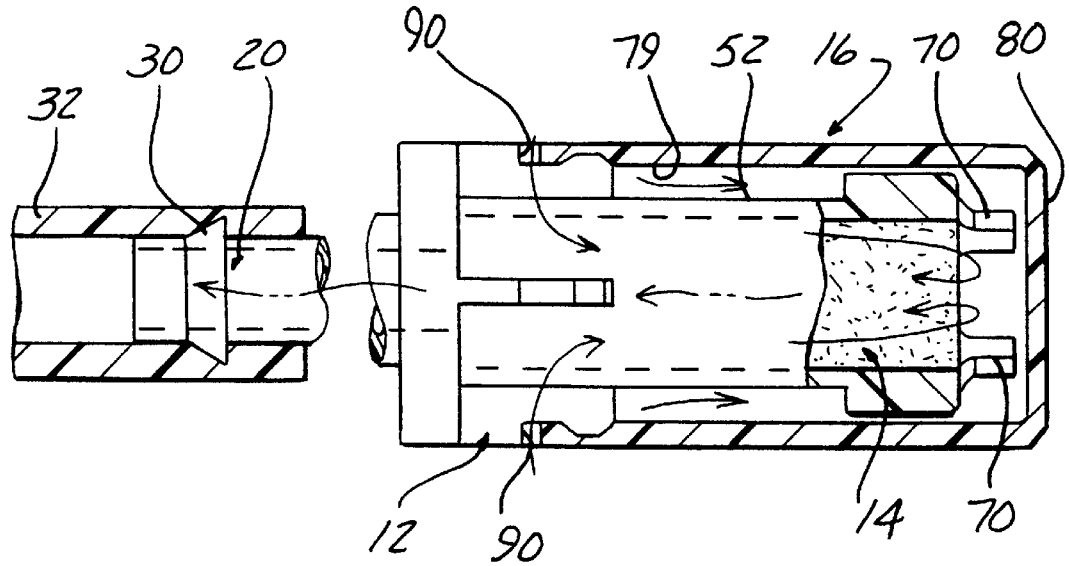
FIG. 4 is a partially cross sectioned, side elevational view showing the assembled air filter of the present invention.

The filter insert 14 may be formed of any suitable air filter material. By way of example only, the filter insert 14 is formed of a foam or sponge urethane and has a generally cylindrical shape to enable the filter insert 14 to be urged into the bore 28 in the second tubular portion 22 of the filter body 12 as shown in FIGS. 3, 4 and 6. In this mounting position, a first end 74 of the filter 14 is positioned adjacent one end of the bore 26 in the first tubular portion 20 of the filter body 12. The opposed second end 76 of the filter 14 is disposed generally in-line or adjacent to the second end 62 of the second tubular portion 22 in fluid communication with the notches 72 between the fingers 70; but surrounded completely by the wall of the second tubular portion 22.

The end cap 16 is also formed of a suitable light weight material, such as a plastic. By way of example only, an Olefin plastic is employed to form the cap 16.

The cap 16 has a generally cylindrical cross section with an annular side wall 78 having an inner surface 79, a closed end wall 80 and an opposed open end 82, all of which form a hollow interior chamber 84 within the end cap 16. An annular, recessed, mounting groove 86 is formed in the inner surface 79 of the side walls 78 spaced from the open end 82.

In assembling the air filter 10 of the present invention, as shown in FIGS. 4 and 6, the filter insert 14 is inserted through the second end 62 of the second tubular portion 22 of the filter body 12 between the fingers 70 until the first end 74 of the filter insert 14 abuts a shoulder formed at the juncture of the first and second bores 26 and 28 in the filter body 12. Next, the end cap 16 is slidingly urged over the second tubular portion 52 by sliding the open end 82 over the fingers 70 and the second rib 60 of each rib pair. The exemplary angled outer top edge of the second ribs 60 guide and center the end cap 16 over the plurality of rib pairs 58, 60.

The end cap 16 is continued to be urged over the second tubular portion 26 of the filter body 12 until the groove 86 in the inner surface 79 of the end cap 16 engages the complementary projection 69 formed on the end of each first rib 58. In this position, as shown in FIGS. 4 and 6, the open end 82 of the end cap 16 seats within the notch 64 on each of the first ribs 58. Further, the engagement of the groove 86 with the projection 69 spaces the end 82 of the end cap 16 a short distance from the wall 65 formed on each first rib 58 by the notch 64. This forms an air inlet denoted by reference number 90 about substantially the entire open end 82 of the end cap 16 to the interior cavity formed between each of the rib pairs 58 and 60, the interior surface 79 of the end cap 16 and the exterior surface 52 of the second tubular portion 22 to the filter body 12. Air can flow through the inlet 90 along the exterior surface of the second tubular portion 22 toward the second end 62 of the filter body 12. The air flow path continues through the notches 72 between the fingers 70 and into the second end 62 of the filter 76.

Also, in this mounting position, the closed wall 80 of the cap 16 abuts or is spaced a short distance from the outer end of the fingers 70.

This forms a labyrinth, multi-directional air flow path which first causes air to flow in one direction between the exterior surface 52 of the second tubular portion 22 of the filter body 12 and the interior surface 79 of the end cap 16 and then in an opposite 180°, direction through the filter insert 14 in the bore 28 in the filter body 12. This labyrinth path, in addition to the small inlet opening 90, minimizes the possibility of water, moisture or other fluids from entering traveling along the entire length of the second tubular portion 22 of the filter body 12 to the filter 14 insert mounted within the bore 28 in the interior of the second tubular portion 22. In this manner, fluid ingestion to the vehicle air compressor is minimized or substantially prevented.

Any moisture which may enter the inlet 90 will generally remain at the location of the inlet 90. Mounting the filter body 12 at a downward extending angle from the second end 62 will enable gravity to cause any water which may accumulate in the inlet 90 to drip off of the filter body 12.

In summary, there has been disclosed a unique air filter which minimizes or substantially prevents the passage of water or moisture through the filter to a connected component, such as a vehicle air compressor. The inventive air filter is of simple construction and may be easily mounted in various positions on support structure.

What is claimed is:

1. An air filter apparatus comprising:

a body having a through bore;

an air filter element mountable within the bore; and means, cooperating with the body, for forming a labyrinth air flow path from an air inlet at one end of the means through the bore in the body, the air flow path forming means including:

the body having a tubular end portion;

a plurality of ribs extending outward from the end portion, each rib having an outer edge;

a cap having a side wall with an inner surface, a first end, and an end wall at an opposite end;

the cap removably mounted over the ribs spacing the inner surface of the cap from an exterior surface of the tubular end portion of the body to form the air flow path between the inner surface of the cap and the exterior surface of the tubular end portion of the body; and means, formed in the tubular end portion of the body adjacent one end thereof, for disposing the through bore in the body in fluid flow communication with the air flow path between the sidewall of the cap and the tubular end portion of the body.

2. The air filter apparatus of claim 1 wherein the air flow path has multiple direction flow path portions.

3. The air filter apparatus of claim 2 wherein the multiple direction flow path portions are disposed in opposed directions.

4. The air filter apparatus of claim 3 wherein the opposed direction flow path portions are disposed substantially parallel.

5. The air filter apparatus of claim 1 wherein the means for disposing the through bore in fluid flow communication with the air flow path comprises:

at least one aperture formed at the end of the tubular end portion of the body and communicating with one end of the bore.

6. The air filter apparatus of claim 5 wherein at least one aperture comprises:

at least one open-ended notch extending from the end of the tubular portion of the body.

7. The air filter apparatus of claim 1 wherein the air flow path forming means further comprises:

one of an interengagable groove and projection formed on the at least one rib and the other of the groove and projections formed on the cap for releasably interconnecting the cap and the at least one rib.

8. The air filter apparatus of claims 7 wherein:

a projection is formed on the at least one rib; and a recessed groove is formed in the inner surface of the side wall of the cap spaced from the open end of the cap.

9. The air filter apparatus of claim 8 wherein the recessed groove is an annular groove formed on the inner surface of the side wall of the end cap.

10. The air filter apparatus of claim 1 wherein:

the plurality of ribs includes a plurality of first ribs and a plurality of second ribs;

each one of the second ribs axially aligned with one of the first ribs;

the first ribs have a projection formed thereon; and the cap having a groove formed thereon.

11. The air filter apparatus of claim 10 wherein:

each of the first ribs axially aligned with one of the second ribs to form an axially aligned pair of first and second ribs on the exterior surface of the tubular end portion of the body.

12. The air filter apparatus of claim 10 further comprising:

each first rib has a radial outer edge having a notch extending therefrom, the notch forming an axial end projection on the first rib.

13. The air filter apparatus of claim 2 wherein:

the air inlet is spaced from one end of the bore in the body.

* * * * *